A. BUGBEE.
STORAGE BATTERY.
APPLICATION FILED APR. 21, 1920.

1,382,270.

Patented June 21, 1921.
4 SHEETS—SHEET 1.

Alvin Bugbee
Inventor

By his Attorney
Macdonald & Macdonald

A. BUGBEE.
STORAGE BATTERY.
APPLICATION FILED APR. 21, 1920.
1,382,270.
Patented June 21, 1921.
4 SHEETS—SHEET 2.
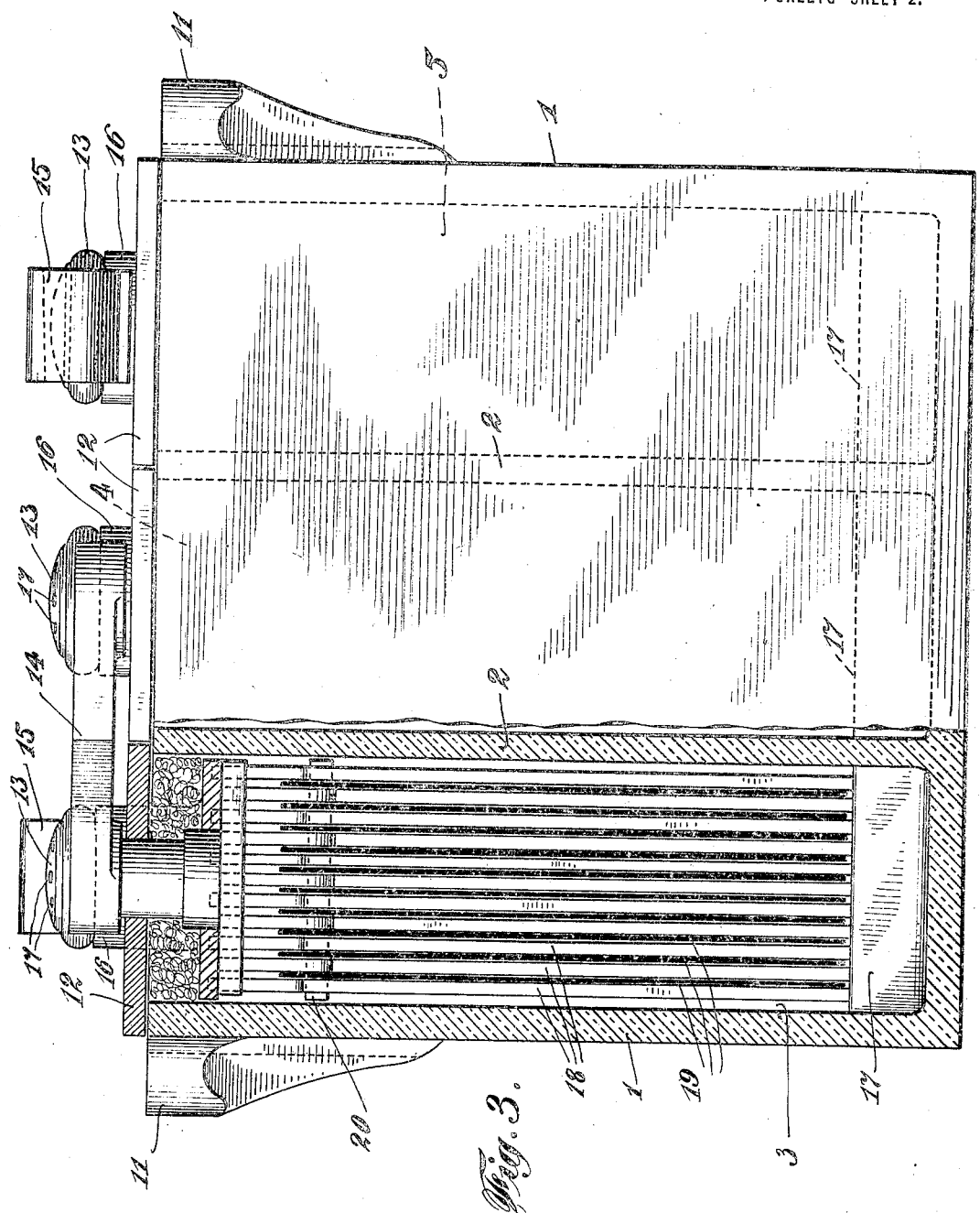
Alvin Bugbee
Inventor
By his Attorneys
Macdonald & Macdonald

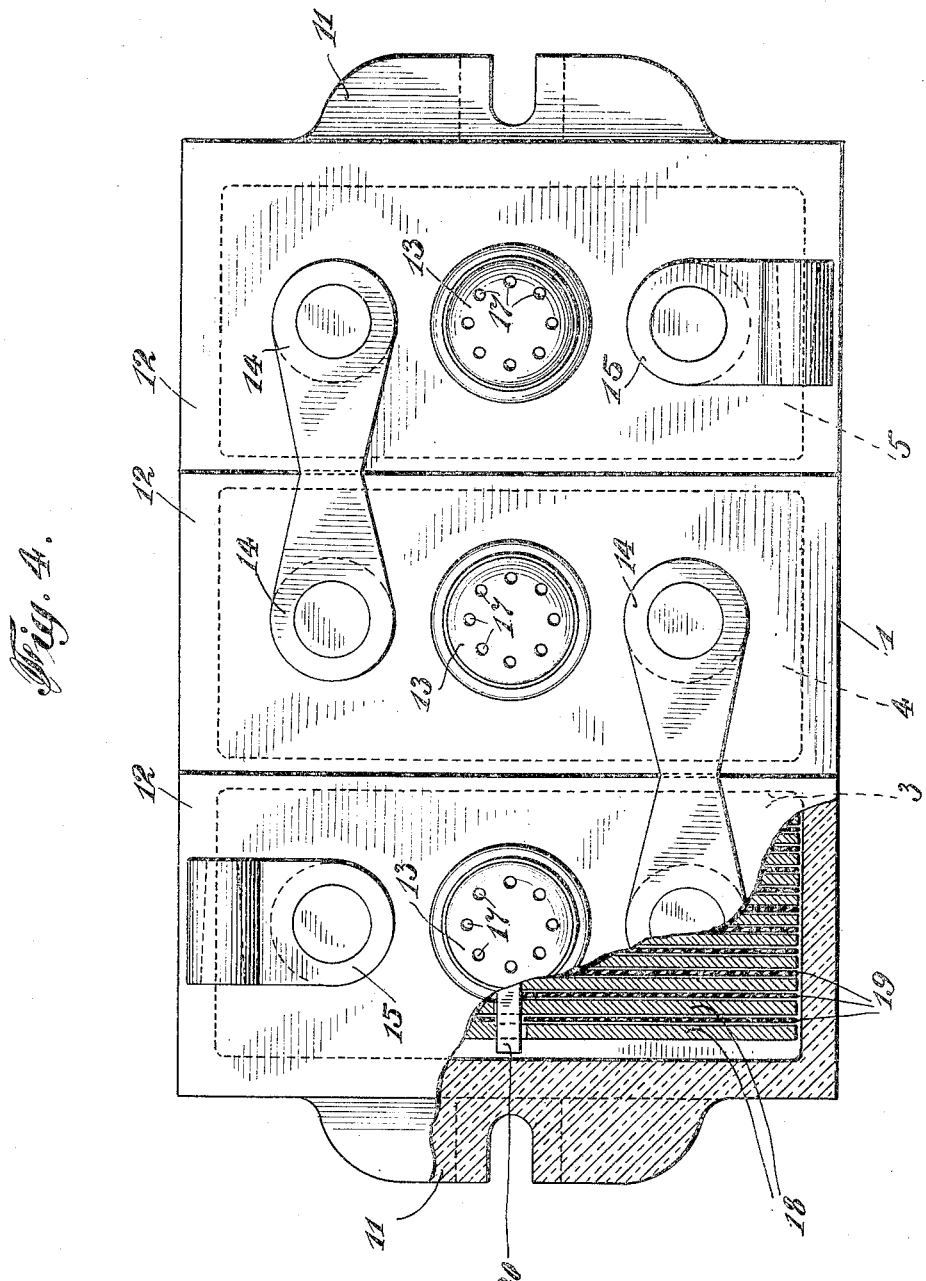

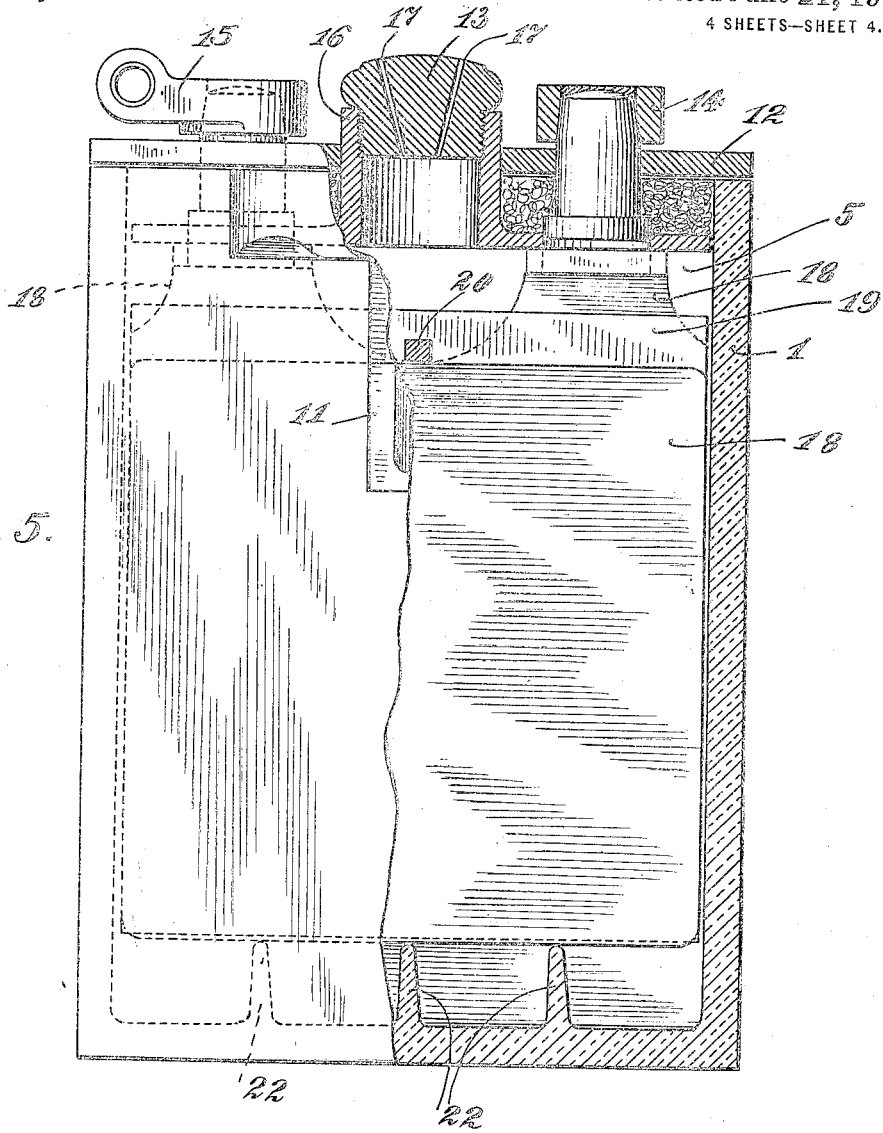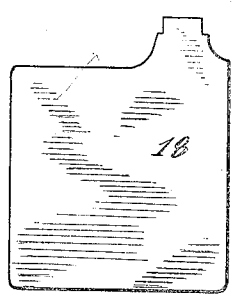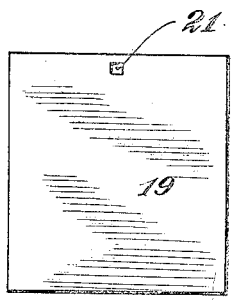

UNITED STATES PATENT OFFICE.

ALVIN BUGBEE, OF TRENTON, NEW JERSEY.

STORAGE BATTERY.

1,382,270.                    Specification of Letters Patent.    Patented June 21, 1921.

Application filed April 21, 1920. Serial No. 375,435.

*To all whom it may concern:*

Be it known that I, ALVIN BUGBEE, a citizen of the United States, and resident of the city of Trenton, county of Mercer, and State of New Jersey, have invented certain new and useful Improvements in Storage Batteries, of which the following is a specification.

My invention relates to secondary battery containers and has particular reference to one-piece containers for automobile starting and lighting batteries in which several storage cells are combined and used as a battery.

As is well known in the art the automobile starting and lighting battery is a storage battery consisting of a usual minimum of three cells and a usual maximum of six cells. It has been customary to assemble these cells as separate units each in its own hard rubber container, the whole placed in a wooden tray or box which is specially treated and prepared to resist the action of the liquid used in the battery. This liquid, known as sulfuric acid, attacks woods and metals but because of the brittleness of hard rubber and glass, the two commercial substances which are commonly used as containers for sulfuric acid, some outside casing must be used to protect these fragile substances from the extremely rough handling they receive in automobile use. As stated, a wooden case properly treated is used for protection, the coating resisting the action of sulfuric acid more or less.

My invention has for its object the provision of a storage battery container of acid resisting material sufficiently strong and rugged to withstand the rough handling and wear of automobile use and which therefore requires no outside protecting tray or box.

Another object of my invention is to provide a form of container which may be readily and cheaply manufactured and in which the receptacles for as many cells as desired may be provided in a single unit.

A further object of my invention is to provide such a form of container by the use of well known materials as to make possible a battery container unit having integral therewith proper lugs, spaces, rests, grooves and channels, giving a one-piece, complete device by a minimum of handling in the manufacture thereof.

Other objects will be apparent as the description proceeds.

For the material of my container I make use of a hard porcelain which may be properly vitrified and glazed as desired.

My invention resides in the construction and arrangement of parts and the choice of materials described in this specification, illustrated in the drawings hereto appended, and particularly pointed out in the claims hereunto annexed.

In the drawings—

Fig. 3 illustrates a side view, partly in section, of another form of container;

Fig. 4 is a plan view, partly in section of the container shown in Fig. 3;

Fig. 5 is an end view, partly in section, of the container shown in Fig. 3;

Figs. 6 and 7 are details of the battery shown in Fig. 3.

Figure 1:
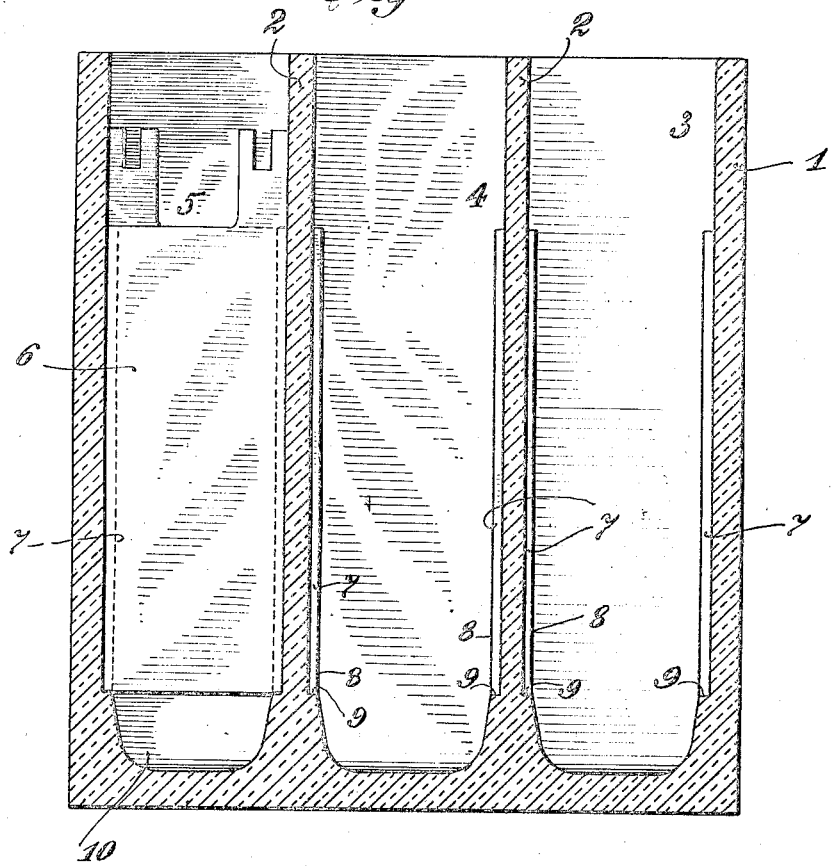
Figure 1 illustrates a cross section of one form of container made according to my invention, showing the separate receptacles for separate cells.
Figure 2:
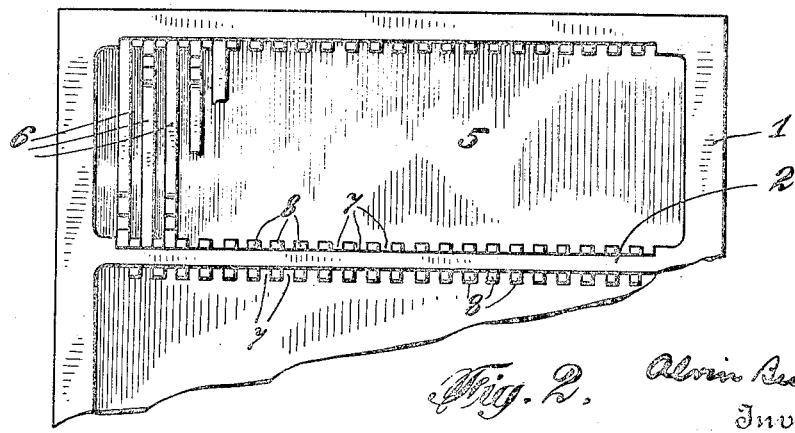
Fig. 2 is a part plan view of the container shown in Fig. 1.

Turning to Fig. 1, my invention provides a container 1 having integral separating walls 2, giving the chambers 3, 4, 5 for three separate sets of plates as shown at 6. Recesses or grooves 7 are formed in the walls, the inbetween portions 8 acting as spacers for the plates. The bottom of the recesses 9 form resting places for the plates thus holding the plates clear of the bottom of the container and leaving space to hold the plates clear of any dropping sediment. The curve of the bottom 10 serves to form a strengthening fillet for the container.

At the side of the container are the lugs 11 (Figs. 3 and 4) molded integral therewith and serving the double purpose of handles and fastening lugs.

Cover plates 12 are of similar porcelain material and are held in position by reason of the connection 14 and terminals 15. These plates are perforated (Fig. 5) for the filling neck 16 into which the filling cap 13 is threaded, the vent holes 17 being shown therein.

In the device shown in Figs. 3, 4 and 5, 18 represents the plates in the most common form of battery and 19 the spacers, in the present instance; the latter being supported by a suspension-bar 20 passing through a perforation 21 in the upper portion of each spacer. In the same figures (3, 4, and 5), the ribs 22, cast integrally with the bottom of the container are used to hold the plates 18 above the sediment at the bottom of the cell.

I do not claim to have invented the particular hard porcelain used in my device but I do claim to have discovered the great advantages to be obtained from casting such containers in one piece from the class of porcelain known in the trade as hard porcelain and usually composed of kaolin, feldspar, chalk, silicious sand, plastic clay and powder of broken porcelain.

What I desire to secure by Letters Patent is:

1. A storage battery container formed of an integral piece of hard porcelain and containing a plurality of storage cell chambers.

2. A storage battery container having a plurality of storage cell chambers with dividing partitions formed integral with said container.

3. A storage battery container formed of a piece of hard porcelain and having partitions forming a plurality of chambers therein, plate support ridges in said chambers, and fastening lugs on said container, said partitions ridges and lugs being integral with said container.

4. A molded battery container formed of an integral piece of hard porcelain and having partitions integral therewith forming a plurality of chambers.

ALVIN BUGBEE.